United States Patent
Bromley et al.

(10) Patent No.: US 8,572,163 B1
(45) Date of Patent: Oct. 29, 2013

(54) SYSTEMS AND METHODS FOR DEDUPLICATING DATA BASED ON PERFORMANCE OF A DEDUPLICATION SYSTEM

(75) Inventors: Graham Bromley, Dublin, CA (US); Weibao Wu, Vadnais Heights, MN (US); Mark DuChene, Inner Grove Heights, MN (US); Walter Angerer, Maple Grove, MN (US); Mehmet Balioglu, Fridley, MN (US); Oussama El-Hilali, Maple Grove, MN (US); Mike Zeis, Minneapolis, MN (US)

(73) Assignee: Symantec Corporation, Mountain View, CA (US)

( * ) Notice: Subject to any disclaimer, the term of this patent is extended or adjusted under 35 U.S.C. 154(b) by 939 days.

(21) Appl. No.: 12/551,341

(22) Filed: Aug. 31, 2009

(51) Int. Cl.
*G06F 15/16* (2006.01)
(52) U.S. Cl.
USPC ........... 709/203; 709/202; 709/246; 707/650; 707/692
(58) Field of Classification Search
USPC .......... 709/201–203, 246, 225–226; 707/650, 707/692–694; 711/161–162
See application file for complete search history.

(56) References Cited

U.S. PATENT DOCUMENTS

| | | | | |
|---|---|---|---|---|
| 7,814,149 B1 * | 10/2010 | Stringham | | 709/203 |
| 8,074,043 B1 * | 12/2011 | Zeis | | 711/171 |
| 8,082,228 B2 * | 12/2011 | Mu | | 707/650 |
| 8,095,756 B1 * | 1/2012 | Somavarapu et al. | | 711/162 |
| 8,214,428 B1 * | 7/2012 | Christiaens | | 709/203 |
| 8,244,992 B2 * | 8/2012 | Spackman | | 711/154 |
| 8,255,365 B2 * | 8/2012 | Zeis et al. | | 707/694 |
| 8,346,730 B2 * | 1/2013 | Srinivasan et al. | | 707/692 |
| 8,407,190 B2 * | 3/2013 | Prahlad et al. | | 707/692 |
| 8,412,824 B1 * | 4/2013 | Schiff | | 709/225 |
| 8,412,848 B2 * | 4/2013 | Therrien et al. | | 707/692 |
| 8,468,135 B2 * | 6/2013 | Constantinescu et al. | | 707/640 |
| 2008/0281908 A1 * | 11/2008 | McCanne et al. | | 709/203 |
| 2009/0234795 A1 * | 9/2009 | Haas et al. | | 707/E17.001 |
| 2009/0271402 A1 * | 10/2009 | Srinivasan et al. | | 707/E17.001 |
| 2010/0114833 A1 * | 5/2010 | Mu | | 707/650 |
| 2010/0332454 A1 * | 12/2010 | Prahlad et al. | | 707/E17.01 |
| 2011/0016095 A1 * | 1/2011 | Anglin et al. | | 707/E17.01 |

* cited by examiner

*Primary Examiner* — Bharat N Barot
(74) *Attorney, Agent, or Firm* — ALG Intellectual Property, LLC

(57) ABSTRACT

A computer-implemented method for deduplicating data is disclosed. The method may include identifying a request to transfer data from a client in a deduplication system to a server in the deduplication system. The method may also include determining, based at least in part on performance of the deduplication system, whether to deduplicate the data before transferring the data from the client to the server. The method may further include performing the following, the order of which is based on the determination: deduplicating the data and transferring the data from the client to the server. Various other methods, systems, and computer-readable media are also disclosed.

20 Claims, 8 Drawing Sheets

SYSTEMS AND METHODS FOR DEDUPLICATING DATA BASED ON PERFORMANCE OF A DEDUPLICATION SYSTEM

BACKGROUND

Data deduplication may reduce the amount of storage space used in a single-instance data storage system by detecting and preventing redundant copies of data from being stored to the single-instance data storage system. For example, data deduplication is often used to reduce the amount of storage space needed to maintain backups of an organization's data.

Data deduplication involves identifying redundant copies of the same data. Because of the processing requirements involved in comparing each incoming unit of data with each unit of data that is already stored in a single-instance data storage system, redundant copy identification is usually performed by generating and comparing smaller data signatures ("fingerprints") of each data unit instead of comparing the data units themselves. The detection of redundant copies generally involves generation of a new fingerprint for each unit of data to be stored to the single-instance data storage system and comparison of the new fingerprint to existing fingerprints of data units already stored by the single-instance data storage system. If the new fingerprint matches an existing fingerprint, a copy of the unit of data is likely already stored in the single-instance data storage system.

Existing data deduplication techniques often consume significant computing resources, especially for single-instance data storage systems storing large amounts of data. For example, client-side deduplication techniques, in which data is hashed on the client and only non-redundant data is sent to the server, may require a significant amount of client memory and/or processing resources. In order to reduce client-side resource consumption, server-side deduplication may be implemented, in which all data is transferred to the server, where the data is hashed and only non-redundant data is stored to a single-instance data storage system. However, server-side deduplication may consume a significant amount of network bandwidth and server memory and/or processing resources.

Traditional deduplication systems typically implement either client-side deduplication or server-side deduplication. Unfortunately, choosing between client- and server-side deduplication may be difficult because the performance of both processes can be unpredictable. For example, the performance of both processes may vary based on, among other factors, client load (e.g., other applications may run concurrently with deduplication), server load (e.g., multiple data streams may be concurrently ingested by the server), network load (e.g., concurrent network traffic), and/or the type (e.g., redundant or non-redundant) of data being deduplicated. Therefore, one deduplication process may or may not outperform the other in any given situation.

SUMMARY

As will be described in greater detail below, the instant disclosure generally relates to systems and methods for deduplicating data. According to certain embodiments, a computer-implemented method for deduplicating data may include: 1) identifying a request to transfer data from a client in a deduplication system to a server in the deduplication system, 2) determining, based at least in part on performance of the deduplication system, whether to deduplicate the data before transferring the data from the client to the server, and 3) performing the following, the order of which is based on the determination: deduplicate the data and transfer the data from the client to the server.

In certain embodiments, the method may include determining whether to deduplicate the data before transferring the data from the client to the server by: 1) measuring a first span of time that elapses while deduplicating a predetermined amount of data on the client and transferring the predetermined amount of data to the server, and 2) measuring a second span of time that elapses while transferring the predetermined amount of data to the server and deduplicating the predetermined amount data on the server. If the first span is shorter than the second span, deduplicating the data may be performed before the data is transferred from the client to the server. If the second span is shorter than the first span, deduplicating the data may performed after the data is transferred from the client to the server.

In other embodiments, the method may include determining whether to deduplicate the data before transferring the data from the client to the server by: 1) measuring a first amount of data that is deduplicated on the client and transferred to the server during a predetermined interval of time, and 2) measuring a second amount of data that is transferred to the server and deduplicated on the server during the predetermined interval of time. If the first amount is greater than the second amount, deduplicating the data may be performed before the data is transferred from the client to the server. If the second amount is greater than the first amount, deduplicating the data may be performed after the data is transferred from the client to the server.

In various embodiments, the determination may be performed at periodic intervals. In certain embodiments, the method may include determining how frequently deduplication switches between the client and the server and may include setting a length of at least one of the periodic intervals based on how frequently deduplication switches between the client and the server.

In some embodiments, the determination may be based at least in part on a central-processing-unit load on the client. If the central-processing-unit load on the client is below a predetermined threshold, deduplicating the data may be performed before the data is transferred from the client to the server. Alternatively, deduplicating the data may be performed after the data is transferred from the client to the server if the central-processing-unit load on the client is above a predetermined threshold.

According to certain embodiments, the determination may be based at least in part on a central-processing-unit load on the server. In at least one embodiment, the determination may be based at least in part on performance of a network that transfers the data from the client to the server.

In various embodiments, the determination may be based at least in part on a comparison of at least two of: performance of the client, performance of the server, and performance of a network that transfers the data from the client to the server. In certain embodiments, the determination may be based at least in part on a user preference for preserving a resource of at least one of: the client, the server, and/or a network that transfers the data from the client to the server.

According to various embodiments, a system for deduplicating data may include a data-transfer module programmed to identify a request to transfer data from a client in a deduplication system to a server in the deduplication system and to transfer the data from the client to the server; a deduplication module programmed to determine, based at least in part on performance of the deduplication system, whether to deduplicate the data before transferring the data from the client to the server and to deduplicate the data; a storage device configured to store the data; and one or more processors configured to execute the data-transfer module and the deduplication module.

In certain embodiments, the deduplication module may be programmed to determine whether to deduplicate the data before transferring the data from the client to the server by: 1) measuring a first span of time that elapses while deduplicating a predetermined amount of data on the client and transferring the predetermined amount of data to the server, and 2) measuring a second span of time that elapses while transferring the predetermined amount of data to the server and deduplicating the predetermined amount of data on the server. The deduplication module may be programmed to deduplicate the data before the data is transferred from the client to the server if the first span is shorter than the second span. The deduplication module may further be programmed to deduplicate the data after the data is transferred from the client to the server if the second span is shorter than the first span.

In some embodiments, the deduplication module may be programmed to perform the determination at periodic intervals. In certain embodiments, the deduplication module may be programmed to determine how frequently deduplication switches between the client and the server and may be programmed to set a length of at least one of the periodic intervals based on how frequently deduplication switches between the client and the server.

In at least one embodiment, the deduplication module may be programmed to perform the determination based at least in part on a central-processing-unit load on the client. In certain embodiments, the deduplication module may be programmed to deduplicate the data before the data is transferred from the client to the server if the central-processing-unit load on the client is below a predetermined threshold, and the deduplication module may be programmed to deduplicate the data after the data is transferred from the client to the server if the central-processing-unit load on the client is above the predetermined threshold.

In some embodiments, the deduplication module may be programmed to perform the determination based at least in part on a comparison of at least two of: performance of the client, performance of the server, and/or performance of a network that transfers the data from the client to the server.

According to some embodiments, a computer-readable-storage medium comprising one or more computer executable instructions that, when executed by at least one processor of a computing device, may cause the device to: 1) identify a request to transfer data from a client in a deduplication system to a server in the deduplication system, 2) determine, based at least in part on performance of the deduplication system, whether to deduplicate the data before transferring the data from the client to the server, and 3) perform the following, the order of which is based on the determination: deduplicate the data and transfer the data from the client to the server.

In various embodiments, the determination may be based at least in part on a comparison of at least two of: performance of the client, performance of the server, and performance of a network that transfers the data from the client to the server.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
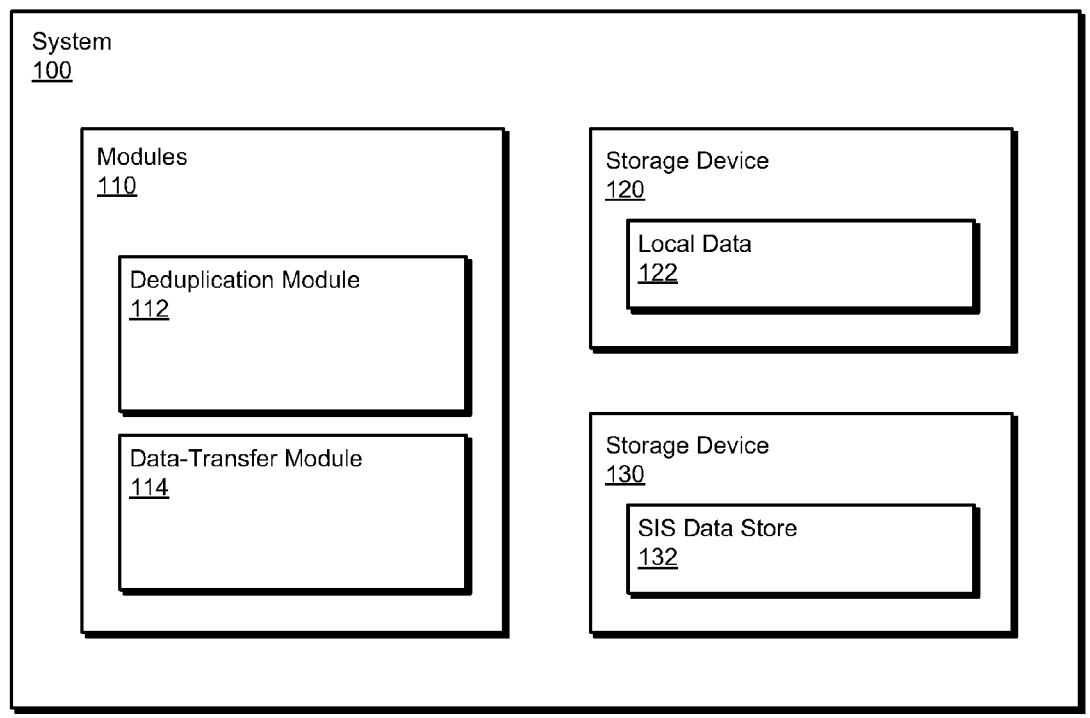
FIG. 1 is a block diagram of an exemplary system for deduplicating data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure presents various methods and systems for deduplicating data. Embodiments of this disclosure may determine an optimal and/or desired location for data deduplication and may switch some or all data deduplication operations to the optimal or more desirable location. A deduplication system may use one or more of a variety of factors to determine which location (e.g., a client or a server) should perform deduplication. For example, the deduplication system may determine whether client- or server-side deduplication is faster. In some embodiments, the deduplication system may determine which location provides faster deduplication by comparing how long server-side deduplication takes to deduplicate a specific amount of data with how long client-side deduplication takes to deduplicate the same amount of data. In other embodiments, the deduplication system may determine which location provides faster deduplication by comparing how much data is deduplicated in a specific amount of time in a client-side deduplication process with how much data is deduplication in the same amount of time in a server-side deduplication process.

In addition to or instead of determining the fastest process for performing deduplication, a deduplication system may use a variety of other parameters and/or preferences to determine where to deduplicate data. For example, the deduplication system may measure the performance of the client (e.g., a central-processing-unit ("CPU") load of the client), the performance of the server (e.g., a CPU load of the server), and/or the performance of a network connecting the client and server (e.g., the available bandwidth of the network) and may use one or more of these measurements to determine where to perform data deduplication. The deduplication system may also take user preferences and/or other user input into account in determining where to perform deduplication.

In some embodiments, the deduplication system may dynamically determine where to perform deduplication. For example, the deduplication system may reevaluate where to perform deduplication in periodic intervals. In other embodiments, reevaluation may be triggered by performance of a deduplication system and/or one or more other factors. By monitoring the performance and/or load of a deduplication system, the deduplication module may consistently determine the best and/or preferred location for data deduplication.

Figure 2:
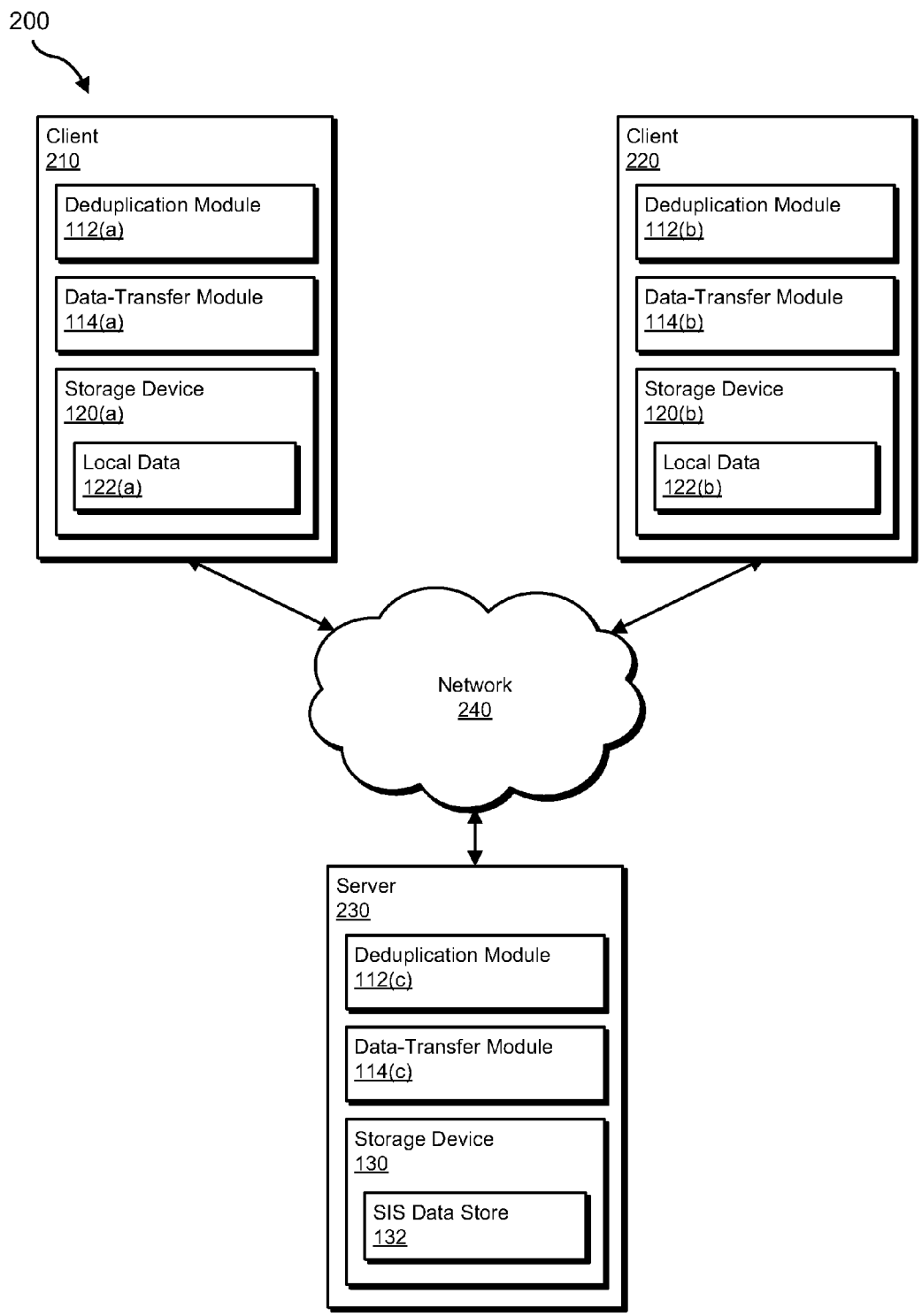
FIG. 2 is a block diagram of another exemplary system for deduplicating data.

The following will provide, with reference to FIGS. 1-2, detailed descriptions of exemplary systems for deduplicating data. Detailed descriptions of corresponding computer-implemented methods will be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary deduplication system 100 for deduplicating data. As illustrated in this figure, exemplary system 100 may include one or more modules 110 for performing one or more tasks. For example, and as will be explained in greater detail below, exemplary system 100 may include a deduplication module 112 and a data-transfer module 114. Data-transfer module 114 may be programmed to identify a request (e.g., a backup request) to transfer data from a client in a deduplication system to a server in the deduplication system and may be programmed to transfer the data from the client to the server in response to the request. Deduplication module 112 may be programmed to determine, based at least in part on performance of the deduplication system, whether to deduplicate the data before data-transfer module 114 transfers the data from the client to the server and may also perform the deduplication based on the determination. Although illustrated as separate elements, one or more of modules 110 in FIG. 1 may represent portions of a single module or application.

In certain embodiments, one or more of modules 110 in FIG. 1 may represent one or more software applications or programs that, when executed by a computing device, may cause the computing device to perform one or more tasks. For example, as will be described in greater detail below, one or more of modules 110 may represent software modules stored and configured to run on one or more computing devices, such as the devices illustrated in FIG. 2 (e.g., client 210, client 220, and/or server 230), computing system 710 in FIG. 7, and/or portions of exemplary network architecture 800 in FIG. 8. One or more of modules 110 in FIG. 1 may also represent all or portions of one or more special-purpose computers configured to perform one or more tasks.

As illustrated in FIG. 1, exemplary system 100 may also include storage devices 120 and 130. Storage devices 120 and 130 may generally represent any type or form of data storage device and/or medium (e.g., a computer-readable storage medium), such as the storage devices illustrated and described in connection with FIGS. 7 and 8. Storage devices 120 and 130 may also represent a portion of one or more computing devices. For example, storage devices 120 and 130 may represent a portion of computing system 710 in FIG. 7 and/or portions of exemplary network architecture 800 in FIG. 8. Data may be stored in storage devices 120 and 130 using any suitable data structure or data storage mechanism. As will be explained in greater detail below, storage device 120 may include local data 122, and storage device 130 may include single-instance-storage ("SIS") data store 132.

FIG. 2 show an exemplary implementation of system 100 in an exemplary deduplication system 200. As illustrated in this figure, exemplary deduplication system 200 may include a client 210 and a client 220 in communication with a server 230 via a network 240. In general, clients 210 and 220 may represent any type or form of computing device capable of transmitting data, and server 230 may represent any type or form of computing device that is capable of receiving data.

Clients 210 and 220 may also represent any type or form of computing device capable of reading computer-executable instructions and performing one or more of the client-side deduplication operations described herein. Examples of clients 210 and 220 may include, without limitation, laptops, desktops, servers, cellular phones, personal digital assistants ("PDAs"), multimedia players, embedded systems, combinations of one or more of the same, exemplary computing system 710 in FIG. 7, clients 810-830 in FIG. 8, or any other suitable computing device.

Similarly, server 230 may also represent any type or form of computing device capable of reading computer-executable instructions and performing one or more of the server-side deduplication operations and/or single-instance data storage operations described herein. Examples of server 230 may include, without limitation, laptops, desktops, servers, combinations of one or more of the same, exemplary computing system 710 in FIG. 7, servers 840 and 845 in FIG. 8, or any other suitable computing device.

Network 240 generally represents any medium or architecture capable of facilitating communication or data transfer. Examples of network 240 include, without limitation, an intranet, a wide area network ("WAN"), a local area network ("LAN"), a personal area network ("PAN"), the Internet, power line communications ("PLC"), a cellular network (e.g., a GSM Network), exemplary network architecture 800 in FIG. 8, or the like. Network 240 may facilitate communication or data transfer using wireless or wired connections. In one embodiment, network 240 may facilitate communication between client 210, client 220, and server 230. Although not shown, in at least one embodiment, client 210 and/or client 220 may be directly connected to server 230.

As illustrated in FIG. 2, client 210 may include a deduplication module 112(a), a data-transfer module 114(a), and local data 122(a) located on storage device 120(a). Similarly, client 220 may include a deduplication module 112(b), a data-transfer module 114(b), and local data 122(b) located on storage device 120(b). Also shown in FIG. 2, server 230 may include a deduplication module 112(c), a data-transfer module 114(c), and SIS data store 132 located on storage device 130.

According to certain embodiments, deduplication modules 112(a) and 112(b) may be programmed to perform one or more client-side deduplication operations, and deduplication module 112(c) and may be programmed to perform one or more server-side deduplication operations. Data-transfer modules 114(a), 114(b), and 114(c) may be programmed to identify a request to transfer data, to transfer data, and to receive data.

As mentioned above, storage device 130 may include SIS data store 132, which may comprise one or more collections of single-instance data, such as a single-instance database, for example. As used herein, "single-instance data" generally refers to non-duplicate data. Hence, SIS data store 132 may be configured to store only non-redundant instances of data. Deduplication modules 112(a), 112(b), and 112(c) may perform data deduplication in order to prevent data from being redundantly stored to SIS data store 132.

As used herein, "data deduplication" may refer to one or more operations related to reducing the amount of storage space used in a single-instance data storage system, including operations for detecting and preventing data from being redundantly stored to the single-instance data storage system (e.g., SIS data store 132).

The following is an example of how exemplary system 200 may be used to perform data deduplication in order to backup data from local data 122(*a*) located on client 210 to SIS data store 132. In this example, data from local data 122(*a*) may be marked for storage (e.g., backup) to SIS data store 132 of server 230. The data may comprise a data set (e.g., a logical set of files and/or directories) marked for storage to SIS data store 132 of server 230.

The data may be any data from local data 122(*a*) and may include any data stored on storage device 120(*a*). For example, local data 122(*a*) may include data files, media files, and executable files, such as those used to implement software applications and operating systems, as well as files that are used or generated by such executable files, including files generated by user applications (e.g., word processing programs, email programs, graphics programs, database applications, or the like) executing on a client of a deduplication system. As another example, local data 122(*a*) may include data in a registry and/or file system of a computing device. This description of storage device 120(*a*) may also apply to storage device 120(*b*).

The phrase "marked for storage" may refer to current and/or scheduled future events for storage data to SIS data store 132. For instance, a user may mark data for current backup and/or scheduled future backup. A scheduled backup may include a one-time backup of the data scheduled at a future date and/or a schedule of recurring periodic backups of the data. A request to store the data in SIS data store 132 located on server 230 may be initiated by a user of client 210 marking the data for storage (e.g., backup) to SIS data store 132 or by initiation of a scheduled storage event. An initiation of a request to store data to server 230 may launch one or more data deduplication operations.

For example, data-transfer module 114(*a*) may identify a request to transfer data included in local data 122(*a*) from client 210 to server 230 in order to backup the data to SIS data store 132 on server 230. Deduplication module 112(*a*) may determine, based on performance of deduplication system 200 (e.g., CPU load of client 210, CPU load of server 230, and/or available bandwidth of network 240), whether to deduplicate the data before transferring the data from client 210 to server 230. For example, if deduplication module 112(*a*) detects that the CPU load on client 210 is low enough to allow deduplication on client 210, deduplication module 112(*a*) may deduplicate the data in order to determine what portions of the data are already stored in SIS data store 132, and data-transfer module 114(*a*) may transfer non-redundant portions of the data to server 230.

Transfer of data from local data 122(*a*) to SIS data store 132 is illustrative only. One or more of the deduplication operations described herein may be similarly performed for transfer of data from other sources to SIS data store 132. For example, data (e.g., a stream of data) may be pushed from an external source (e.g., from an external device) to client 210 (e.g., over network 240) for deduplication and storage to SIS data store 132. As another example, client 210 may generate and provide data (e.g., a data stream and/or a log file) for deduplication and storage to SIS data store 132 without the data first being stored in storage device 120(*a*), such that the data does not originate from storage device 120(*a*).

Although not shown in FIG. 2, in order to facilitate client-side deduplication, client 210 and/or 220 may be configured to maintain client-side fingerprint caches. A fingerprint cache may represent a collection of one or more fingerprints associated with a data selection, such as a data selection stored or marked for storage to SIS data store 132. A fingerprint cache may represent one or more versions of a collection of fingerprints, including versions of the collection of fingerprints before, during, and/or after performance of one or more data deduplication operations. As an example, a fingerprint cache may represent a collection of fingerprints associated with a previous storage event (e.g., a most recent previous backup) or multiple previous storages events (e.g., multiple previous backups) of a data selection to SIS data store 132. As another example, a fingerprint cache may represent a newly initialized collection of fingerprints for use in client-side deduplication for storage of a data selection to SIS data store 132.

In various embodiments, clients 210 and 220 may include fingerprints of all data stored in SIS data store 132. Clients 210 and 220 may use these fingerprints to determine, without querying server 230, whether the data to be stored is redundant and has already been stored in SIS data store 132. In other embodiments, clients 210 and 220 may, after generating a fingerprint for the data, query server 230 to determine whether the data is redundant.

Figure 3:
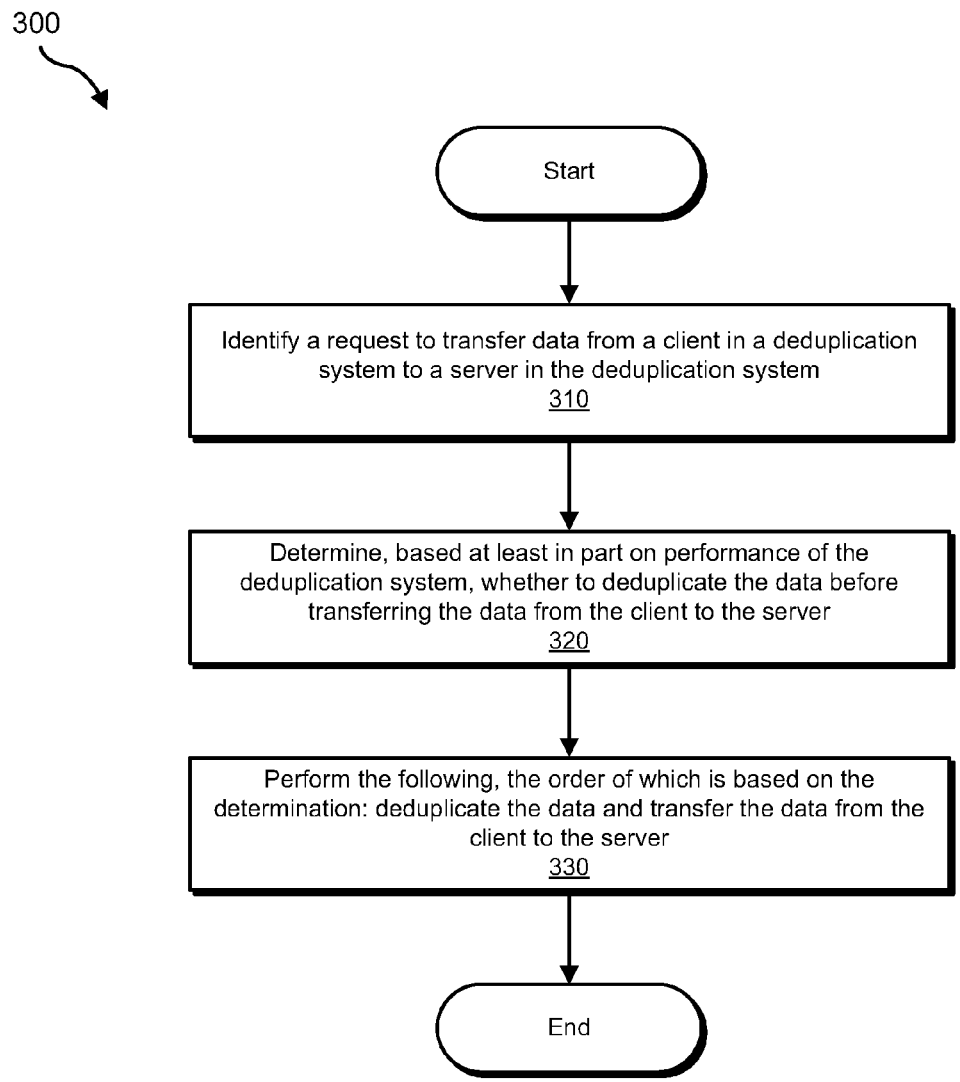
FIG. 3 is a flow diagram of an exemplary method for deduplicating data.

FIG. 3 is a flow diagram of an exemplary computer-implemented method 300 for deduplicating data. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2, as will be explained in greater detail below.

At step 310, the system may identify a request to transfer data from a client in a deduplication system to a server in the deduplication system. For example, data-transfer module 114(*a*) may identify a request to transfer data included in local data 122(*a*) from client 210 to server 230. As previously noted, the term "data" may refer to any data located on the client. For example, data may refer to any data stored to a storage device (e.g., storage device 120(*a*)) or memory of the client. The data may include, without limitation, a collection of data (e.g., a set of files or a set of data blocks), a single file, portions of a single file, a data stream, and/or a fingerprint identifying one or more of the same.

Data-transfer module 114(*a*) may identify a variety of requests. For example, data-transfer module 114(*a*) may identify a request to backup data to server 230, a request to archive data to server 230, and/or any other request to transfer data from a client in a deduplication system to a server in a deduplication system.

As an example of step 310, data-transfer module 114(*a*) may receive a request to backup data included in local data 122(*a*) on client 210 to SIS data store 132 on server 230. Data-transfer module 114(*a*) may identify the request in any suitable way, including by detecting a predefined event, which may include receipt of user input identifying the data and/or requesting that the data be transferred (e.g., backed up) to server 230 or initialization of a scheduled data storage event (e.g., a recurring data backup) at a predetermined time.

Because SIS data store 132 may only store non-redundant data, the system may need to deduplicate the data before the data is stored to SIS data store 132. At step 320, the system may determine, based at least in part on performance of the deduplication system, whether to deduplicate the data before transferring the data from the client to the server. For example, deduplication module 112(*a*) may determine whether to deduplicate the data to be stored in SIS data store 132 before data-transfer module 114(a) transfers the data from client 210 to server 230.

The determination may be based on any performance metric of the deduplication system. Examples of performance metrics may include, without limitation, performance of the client, performance of the server, and/or performance of a network that transfers the data from the client to the server.

A deduplication system may determine system performance in a variety of ways. Examples may include, without limitation, comparing the time taken to deduplicate data on the client to the time taken to deduplicate data on the server, comparing the amount of data deduplicated on the client during a specific amount of time to the amount of data deduplicated on the server during the same amount of time, measuring CPU load on the client, measuring CPU load on the server, measuring available bandwidth on the network, and/or measuring any other performance metric of the deduplication system.

For example, if deduplication module 112(a) detects an abundance of CPU availability on client 210 through a series of measurements of CPU performance of client 210, then deduplication module 112(a) may initiate deduplication on client 210. The various ways in which the system may determine whether to deduplicate the data before transferring the data from the client to the server will be more fully understood upon reading the descriptions of FIGS. 4-6.

In at least one embodiment, determining whether to deduplicate the data before transferring the data from the client to the server may include determining whether to perform all or a portion of data deduplication operations on the data before transferring the data from the client to the server. For example, deduplication module 112(a) may decide to perform client-side deduplication, server-assisted deduplication (i.e., data deduplication is performed on both the client and the server), or server-side deduplication.

In various embodiments, a deduplication module located on the client may communicate with a deduplication module located on the server in order to perform the determination of where the deduplication should be performed. For example, deduplication module 112(a) located on client 210 may communicate with deduplication module 112(c) located on server 230 in order to perform the determination. Deduplication module 112(a) may monitor CPU load on client 210 and may receive the CPU load of server 230 from deduplication module 112(c). Deduplication module 112(a) may then compare client CPU load and server CPU load in determining the location for data deduplication.

In some embodiments, deduplication module 112(a) may use past performance measurements to determine whether the deduplication should occur on the client or the server. For instance, in one embodiment the system may determine a schedule for deduplication. For example, if the determination is performed once a day, and from past measurements it is known that the CPU load on client 210 is a relatively high during 3 a.m. and 4 a.m. each night (perhaps an administrative task is run every night on client 210), deduplication module 112(a) may then determine that deduplication should be performed on server 230 during that hour.

According to certain embodiments, a deduplication system may determine where to perform deduplication at various times. In one embodiment, the deduplication system may perform the determination at periodic intervals. For example, deduplication module 112(a) may perform the determination at time-based intervals (e.g., once a minute, once an hour, and/or once a day). In another example, the deduplication system may perform the determination after a predetermined amount of data has been transferred from the client to the server (e.g., once every 100 MB). In at least one embodiment, the deduplication system may also perform the determination at irregular intervals.

In certain embodiments, the deduplication system may perform the determination continually. For example, determination module 112(a) may monitor the deduplication system's performance and may switch between deduplicating the data on the client and deduplicating the data on the server based on the performance of the deduplication system.

In some embodiments, system performance and/or a user preference may trigger reevaluation of where to perform deduplication. For example, if a user preference specifies up to 40 percent of client CPU may be used for data deduplication and data deduplication is approaching 40% of client CPU, the system may perform the determination again. In this example, if client CPU load attributed to data deduplication exceeds 40 percent, then data deduplication may switch to the server.

As noted previously, the performance of both client-side and server-side deduplication may be variable and unpredictable. Therefore, one method of deduplication may or may not outperform the other in any given instance, which may make periodic determinations useful. The following are examples of ways in which deduplication system performance may change significantly during data deduplication. As a first example, client load may increase for several minutes due to a spike in usage of a database application on client 210, and deduplication module 112(a) may shift deduplication to server 230 during this period. As a second example, network load on network 240 may spike due to several large file uploads or due to client 220 concurrently backing up data to server 230. In such situations, deduplication module 112(a) may shift deduplication to client 210. As a third example, CPU load on server 230 may spike due to multiple data streams being ingested by server 230, and deduplication module 112(a) may shift deduplication to client 210.

Depending on how often these types of changes occur, a predetermined periodic interval may be inadequate. In at least one embodiment, the deduplication system may determine how frequently deduplication switches between the client and the server and may set a length of at least one of the periodic intervals based on how frequently deduplication switches between the client and the server. For example, if deduplication module 112(a) performs the determination once an hour and successive determinations result in the same location for data deduplication, then deduplication module 112(a) may increase the interval by 10 minutes every time successive determinations are the same. Similarly, deduplication module 112(a) may decrease the interval by 10 minutes each time successive determinations are different. In at least one embodiment, the periodic interval may be limited by predefined upper and/or lower bounds.

In another example, deduplication module 112(a) may perform the determination once for every 1 GB of data transferred. If successive determinations result in the same location for data deduplication, deduplication module 112(a) may double the interval to once every 2 GB of data transferred. On the other hand, if successive determinations result in different locations, deduplication module 112(a) may halve the interval to once every 500 MB of data transferred.

In certain embodiments, the determination may be based at least in part on the comparison of at least two of: the performance of the client, the performance of the server, and/or the performance of a network that transfers the data from client to the server. For example, if deduplication module 112(a) detects performance degradation in the network during the transfer of data and client-side deduplication is turned off or is set to a minimum, deduplication module 112(a) may determine whether client 210 has ample CPU availability for client-side deduplication and/or that reinitializing client-side deduplication will increase the performance of the transfer.

In various embodiments, the deduplication system may determine the best location for data deduplication. The phrase "best location" may refer to the optimal location (e.g., the location that maximizes data throughput) for data deduplication, the most preferred location for data deduplication, a location that best preserves a resource (e.g., client CPU, server CPU, or network bandwidth) of the deduplication system, and/or the location best suited for data deduplication for any other reason.

In at least one embodiment, the determination may be based at least in part on a user preference for preserving a resource of at least one of the client, the server, and/or a network that transfers the data from client to server. For example, a user preference may establish a requirement to preserve one or more of a variety of deduplication system resources. Examples of deduplication system resources may include, without limitation, client CPU, client memory, server CPU, server memory, and/or network bandwidth.

In other embodiments, a user preference may indirectly specify a resource to preserve. For example, a user preference may specify a preferred location for data deduplication. In this example, a user may prefer to perform data deduplication on the server in order to preserve client CPU for critical applications running on the client. In another example, a user may prefer data deduplication be performed on the client whenever possible in order to preserve network bandwidth.

In certain embodiments, a user preference may identify a set of priorities or weights associated with various deduplication system resources that may be used to perform the determination. The system may use measurements of the various resources, during both client-side and server-side deduplication operations, to determine the best location for data deduplication. For example, a user preference may indicate that network resources have highest priority. Therefore, the deduplication method that uses the least amount of network resources should be used, which is typically client-side deduplication. However, if the data is all (or mostly) non-redundant, a similar amount of data may be transferred to the server using either client-side or server-side deduplication. In such situations, the system may determine where to perform deduplication by determining which deduplication process uses the least amount of the next highest priority resource.

In some embodiments, the deduplication system may determine whether to performed deduplication on the client or the server based at least partially on a configuration of the client. For example, the deduplication system may determine whether the client is capable of performing deduplication. The deduplication system may determine whether the client is capable of performing deduplication by determining whether appropriate fingerprinting and/or other deduplication software is installed on the client. In some embodiments, the deduplication system may also identify the type of data that is to be deduplicated and may determine whether any software installed on the client is capable of performing one or more deduplication functions on the data.

If the deduplication system determines that appropriate deduplication software is installed on the client, the deduplication system may use one or more other criteria (e.g., one or more of the criteria previously discussed) to determine whether to perform the deduplication on the client or the server. On the other hand, if the deduplication system determines that the appropriate deduplication software is not installed on the client, the deduplication system may decide to perform the deduplication on the server.

At step 330, the deduplication system may perform the following, the order of which may be based on the determination made in step 320: deduplicate the data and transfer the data from the client to the server. For example, deduplication module 112(a) may deduplicate the data on client 210, and data-transfer module 114(a) may then transfer the data to server 230 over network 240. In another example, data-transfer module 114(a) may transfer the data to server 230 over network 240, and deduplication module 112(c) may deduplicate the data on server 230.

The deduplication system may deduplicate the data by detecting redundant data and preventing redundant copies of the data from being stored (e.g., backed up) to a single-instance data storage system (e.g., SIS data store 132) and/or transferred to a server in a deduplication system. Typically, deduplication is performed by dividing the data into units and by generating and comparing smaller data signatures ("fingerprints") of each data unit instead of comparing the data units themselves. Deduplication generally involves generation of a new fingerprint for each unit of data to be stored to the single-instance data storage system or transferred to the server and comparison of the new fingerprint to existing fingerprints of data units already stored by the single-instance data storage system or already transferred to the server. If the new fingerprint matches an existing fingerprint, a copy of the unit of data is likely already stored in the single-instance data storage system or has already been transferred to the server. The system may generate fingerprints representative of data instances in any suitable way, including, without limitation, by using a hash, checksum, or fingerprint generation heuristic.

The deduplication system may deduplicate the data in a variety of ways based on the determination made in step 320. For example, if the system decides to deduplicate the data before transferring the data from the client to the server, the client may perform all (client-side deduplication) or some (server-assisted deduplication) of the data deduplication. If the deduplication system decides to deduplicate the data after transferring the data from the client to the server, the server may perform all (server-side deduplication) of the data deduplication.

In the case of both client-side deduplication and server-assisted deduplication, the deduplication system may first generate a fingerprint for a unit of the data to be deduplicated and may determine whether the fingerprint is included in a fingerprint cache located on the client. As previously stated, a fingerprint cache may include fingerprints of all data already stored in a single-instance data storage system and/or data already transferred to a server in a deduplication system. More generally, a fingerprint cache may include fingerprints of all redundant data that does not need to be transferred to a server in a deduplication system.

To illustrate, when client 210 attempts to backup data to SIS data store 132, deduplication module 112(a) may first determine whether a fingerprint of a unit of the data is included in a client-side fingerprint cache located on client 210. If the fingerprint is located in the fingerprint cache (which may indicate that the data unit associated with the fingerprint has already been sent to server 230 or is already stored in SIS data store 132), client 210 may not send the data unit, a query, or a fingerprint associated with the data unit to server 230. Thus, client-side deduplication may reduce network traffic between client 210 and server 230, which may decrease demands on network bandwidth. Client-side deduplication may also reduce processing demands on server 230.

In one example of client-side deduplication, if the fingerprint is not in the fingerprint cache, data-transfer module 114(a) may transfer the data unit with its corresponding fingerprint to server 230. In at least one embodiment, deduplication module 112(c) may perform one more data deduplication steps before storing the data in SIS data store 132 (e.g., verifying that the data unit is not stored in SIS data store 132). In other embodiments, deduplication module 112(c) may not perform any additional deduplication steps before the data is stored in SIS data store 132.

In server-assisted deduplication, if the fingerprint is not in the fingerprint cache, deduplication module 112(a) may transfer a query and the fingerprint to deduplication module 112(c) on server 230. Deduplication module 112(c) may be configured to perform server-assisted deduplication based on the query and the fingerprint, which may include transmitting a "Do Not Send Data" or a "Send Data" signal to client 210 based on whether the data unit associated with the fingerprint is already stored in SIS data store 132.

As previously mentioned, if the deduplication system decides to deduplicate the data after transferring the data from the client to the server, the server may perform all (server-side deduplication) of the data deduplication. For example, data-transfer module 114(a) may transfer the data from client 210 to server 230. In this case, no deduplication is performed before the transfer of the data. After data-transfer module 114(c) receives the data, deduplication module 112(c) may perform data deduplication on the data. As an example, deduplication module 112(c) may generate a fingerprint for each data unit contained in the data and may compare the fingerprint with fingerprints in a fingerprint cache located on server 230 in order to determine whether the data unit contains redundant information. If deduplication module 112(c) does not find a match, deduplication module 112(c) may store the data unit to SIS data store 132. On the other hand, if deduplication module 112(c) finds a match, deduplication module 112(c) may determine that the data unit contains redundant information and may not store the data unit to SIS data store 132.

The previous descriptions of client-side, server-assisted, and server-side deduplication illustrate situations in which the server is a single-instance-storage target; however, in other embodiments the server may be an intermediate between a client and a single-instance-storage target. When the server is not a single-instance-storage target, the server may perform steps 310-330, thereby taking on the role of a client.

For example, client 210 may represent an application server, and client 220 may represent a backup server configured to backup all of local data 122(a) to server 230, which may be a NAS/SAN device with deduplication capabilities. In this example, client 210 may determine whether to deduplicate local data 122(a) before transferring local data 122(a) to client 220. If client 210 does not deduplicate local data 122(a) then client 220 may determine whether to deduplicate local data 122(a) before transferring local data 122(a) to server 230 for storage. Finally, if local data 122(a) reaches server 230 without being deduplicated, server 230 may deduplicate local data 122(a) before storage to SIS data store 132. Alternatively, deduplication module 112(a) may determine whether to perform data deduplication on client 210, client 220, or server 230. Upon the completion of step 330 exemplary method 300 of FIG. 3 may terminate.

Figure 4:
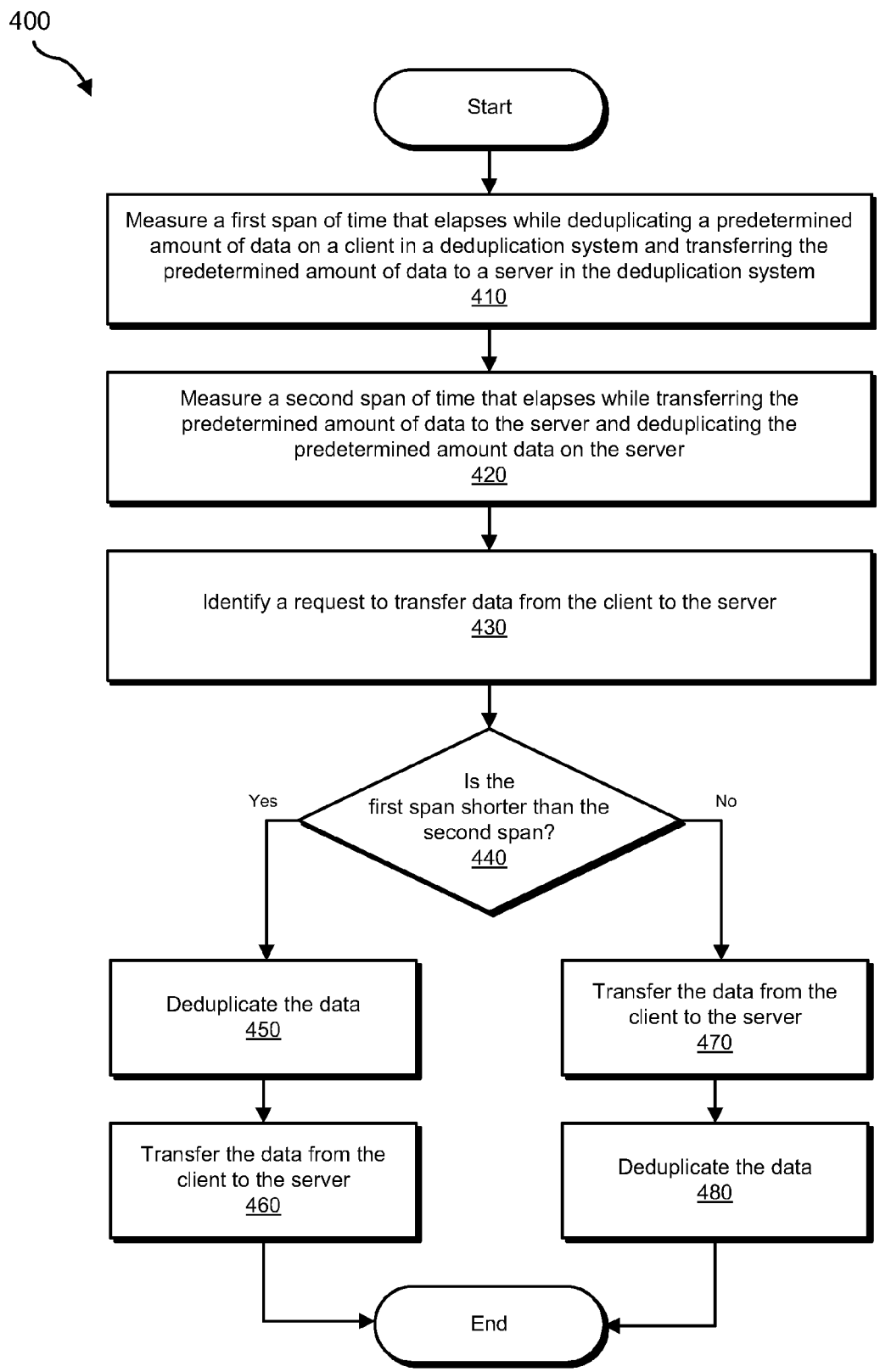
FIG. 4 is a flow diagram of another exemplary method for deduplicating data.

FIG. 4 is a flow diagram of an exemplary computer-implemented method 400 for deduplicating data. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2, as will be explained in greater detail below.

According to one embodiment, at step 410 the deduplication system may measure a first span of time that elapses while deduplicating a predetermined amount of data on a client in a deduplication system and transferring the predetermined amount of data to a server in the deduplication system. For example, deduplication module 112(a) may measure a first span of time that elapses while deduplication module 112(a) deduplicates 50 MB of data on client 210 and while data-transfer module 114(a) transfers the non-redundant portion of the 50 MB of data to server 230.

Deduplication module 112(a) may measure the span of time by measuring the total amount of time elapsed during the deduplication and transferring steps, by measuring total client process time (e.g., total CPU time consumed by deduplication module 112(a) and data-transfer module 114(a)), by measuring total server process time (e.g., total CPU time consumed by deduplication module 112(c) and data-transfer module 114(c)), by measuring data transfer time (e.g., the amount of time network 240 was used to transfer the non-redundant portion of the predetermined amount of data), and/or by measuring any other suitable span of time.

At step 420, the system may measure a second span of time that elapses while transferring the predetermined amount of data to the server and deduplicating the predetermined amount of data on the server. For example, deduplication module 112(a) may measure a second span of time that elapses while data-transfer module 114(a) transfers an additional 50 MB of data to server 230 and while deduplication module 112(c) deduplicates the additional 50 MB of data on server 230.

At step 430, the system may identify a request to transfer data from the client to the server in the deduplication system. For example, data-transfer module 114(a) may identify a request to backup or archive a portion of local data 122(a) from client 210 to SIS data store 132 on server 230. In some embodiments, step 430 may be performed after steps 410 and 420. In other embodiments, step 430 may be performed before steps 410 and 420. In such embodiments, the measurements of steps 410 and 420 may be taken as part of the process of transferring the data identified in step 430 from the client to the server.

At step 440, the deduplication system may determine whether the first span of time measured in step 410 is shorter than the second span of time measured in step 420 and may base the order of the deduplication and transfer steps on whether the first span is shorter or longer than the second span. In the case that the first span is shorter than the second span, the process flow continues to step 450 where the system deduplicates the data on the client and then the system transfers the non-redundant portion of the data from the client to the server (step 460).

Alternatively, when the second span is shorter than the first span then the system may transfer the data from the client to the server (step 470) and may deduplicate the data on the server (step 480). Steps 450-480 may be performed using one or more of the steps and/or procedures discussed in step 330 of FIG. 3 and/or using any other procedures.

According to certain embodiments, steps 410-440 may be performed at periodic intervals. For example, deduplication module 112(a) may remeasure the span of time taken to deduplicate 50 MB of data before and after transferring the data to server 230 once every 1 GB of data transferred. In at least one embodiment, the periodic interval and/or the predetermined amount of data may be set or updated based on how frequently deduplication switches between the client and the server. For example, if successive determinations result in the same location, the period between remeasuring may increase. On the other hand, if successive determinations result in different locations, the period between remeasuring may decrease. In at least one embodiment, the length of the periodic interval may be controlled by upper and/or lower bounds.

According to various embodiments, the steps 450-480 may be part of steps 410-440. For instance, the system may identify a request to transfer 1 GB of data from client 210 to server 230. The first 50 MB may be deduplicated before being transferred to server 230, and the second 50 MB may be deduplicated after being transferred to server 230. Deduplication module 112(*a*) may then determine whether to deduplicate the remaining data on client 210 or server 230 based on which processes was quickest.

Although method 400 compares only client-side deduplication and server-side deduplication, in various other embodiments, other methods of data deduplication may be compared (e.g., server-assisted deduplication). Upon the completion of step 460 or step 480 exemplary method 400 of FIG. 4 may terminate.

Figure 5:
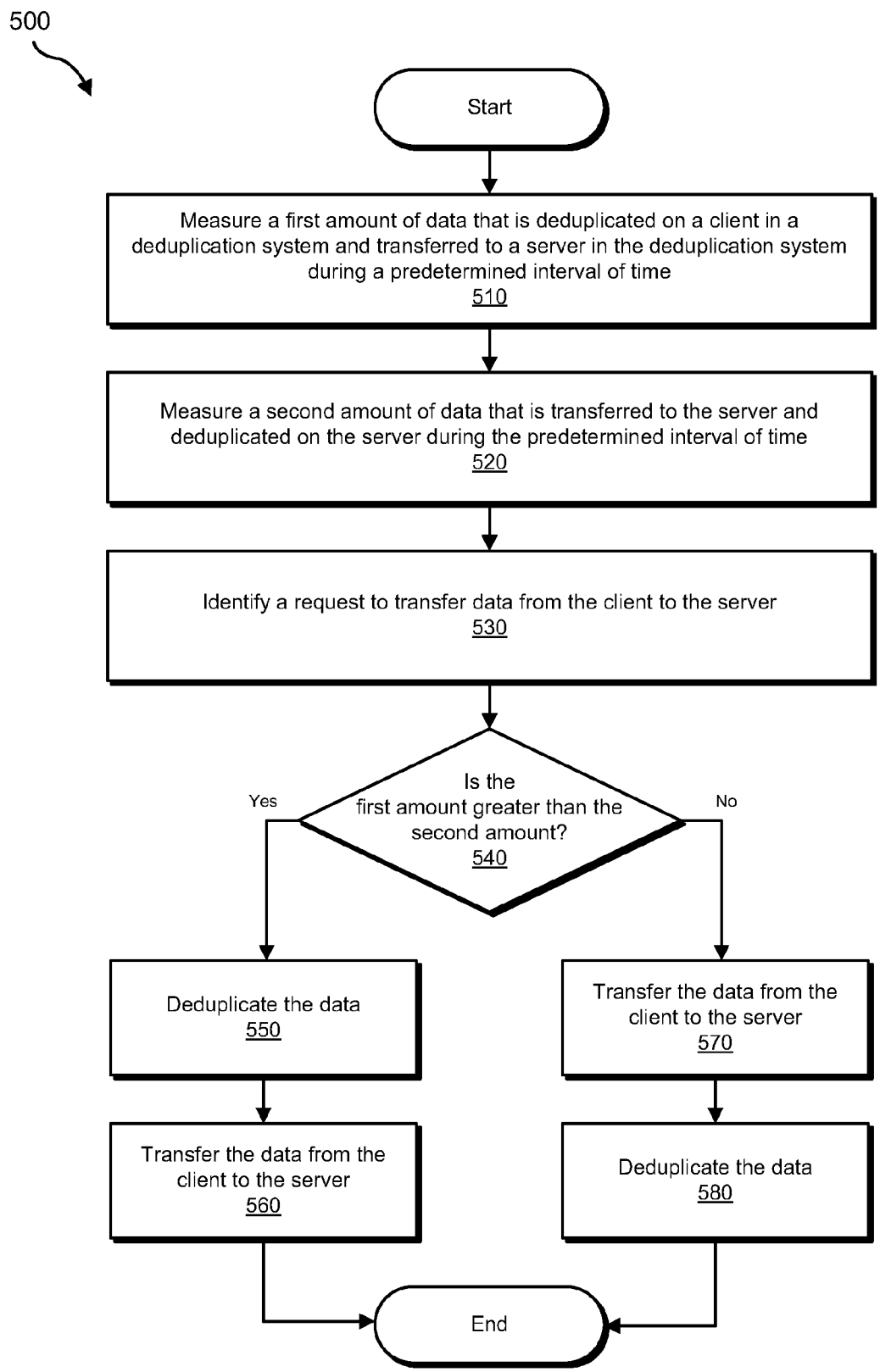
FIG. 5 is a flow diagram of another exemplary method for deduplicating data.

FIG. 5 is a flow diagram of an exemplary computer-implemented method 500 for deduplicating data. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2, as will be explained in greater detail below.

As mentioned previously, the system may measure various performance metrics while deduplicating data on the client and while deduplicating data on the server in order to determine whether to perform data deduplication before or after transferring the data. In some embodiments, as an alternative to the method for measuring system performance described in FIG. 4, the system may measure system performance by measuring the amount of data transferred during a specific interval of time.

According to one embodiment, at step 510, the system may measure a first amount of data that is deduplicated on a client in a deduplication system and transferred to a server in the deduplication system during a predetermined interval of time. For example, deduplication module 112(*a*) may measure a first amount of data that is deduplicated on client 210 and transferred to server 230 during the predetermined interval of time (e.g., an interval of one minute).

The predetermined interval may be based on real time, client CPU time (e.g., CPU time consumed by deduplication module 112(*a*) and data-transfer module 114(*a*)), server CPU time (e.g., CPU time consumed by deduplication module 112(*c*) and data-transfer module 114(*c*)), data transfer time (e.g., network usage time used to transfer the predetermined amount of data), and/or any other indicator of the time used to deduplicate the data on the client and to transfer the data to the server.

At step 520, the system may measure a second amount of data that is transferred to the server and deduplicated on the server during the predetermined interval of time. For example, deduplication module 112(*a*) may measure a second amount of data that is transferred to server 230 and deduplicated on server 230 during the predetermined interval of time (e.g., a second one minute interval).

At step 530, the system may identify a request to transfer data from the client to the server. For example, data-transfer module 114(*a*) located on client 210 may identify a request to transfer a portion of local data 122(*a*) from client 210 to server 230 in order to be stored in SIS data store 132.

At step 540, the system may determine whether the first amount is greater than the second amount and may determine the order of the deduplication and transfer steps based on this determination. If the first amount is greater than the second amount, the system may deduplicate data on the client (step 550) and may transfer the non-redundant portion of the data from the client to the server (step 560).

Alternatively, if the second amount is greater than the first amount, the system may first transfer the data from the client to the server (step 570) and then deduplicate the data on the server (step 580). Steps 550-580 are similar to step 330. Therefore, one or more of the processes presented in the discussion of step 330 may apply to steps 550-580. Upon the completion of step 560 or step 580 exemplary method 500 of FIG. 5 may terminate.

Methods 400 and 500 described steps used to determine whether to deduplicate data before or after transferring the data from a client to a server in a deduplication system based on which method maximizes throughput. In addition to maximizing throughput, various other aspects of deduplication-system performance may be maximized, optimized, and/or preserved. For example, method 600 in FIG. 6 describes steps for determining where it is optimal to apply deduplication based on the central-processing-unit load on the client and whether it is below a predetermined threshold. In this example, deduplication performed on the client may be preferred when possible to preserve network bandwidth and/or limit server CPU load.

Figure 6:
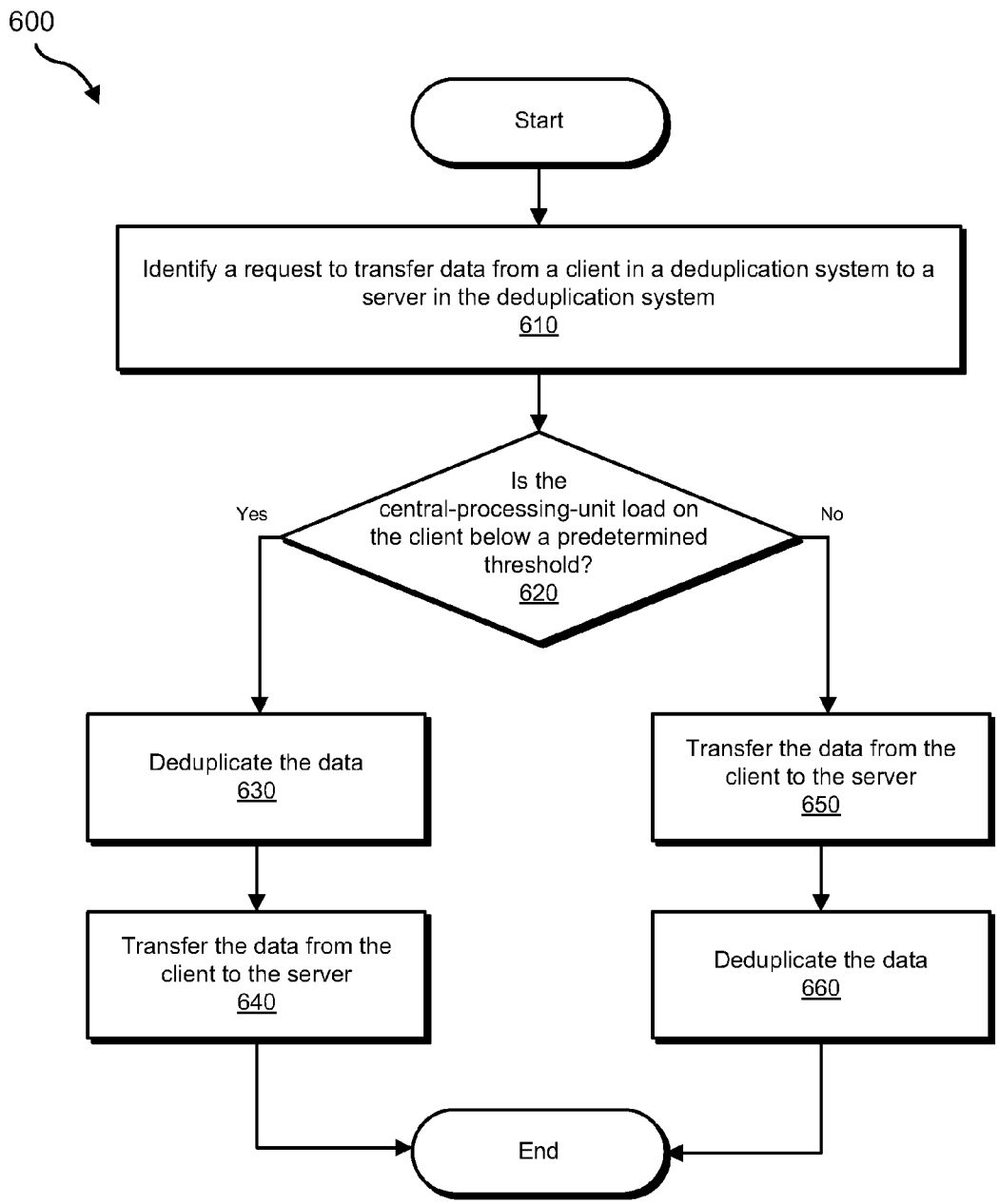
FIG. 6 is a flow diagram of another exemplary method for deduplicating data.

FIG. 6 is a flow diagram of an exemplary computer-implemented method 600 for deduplicating data. The steps shown in FIG. 6 may be performed by any suitable computer-executable code and/or computing system. In some embodiments, the steps shown in FIG. 6 may be performed by one or more of the components of system 100 in FIG. 1 and/or system 200 in FIG. 2, as will be explained in greater detail below.

At step 610, the system may identify a request to transfer data from a client in a deduplication system to a server in the deduplication system. For example, data-transfer module 114(*a*) may identify a request to transfer (e.g., back up) a portion of local data 122(*a*) from client 210 to server 230. Step 610 is similar to step 310 in FIG. 3. Therefore, the discussion of step 310 may also apply to step 610.

At step 620, the system may determine whether to deduplicate data before transferring the data from the client to the server by determining whether the central-processing-unit ("CPU") load (e.g., the percentage of CPU capacity being used) on the client is below a predetermined threshold. For example, deduplication module 112(*a*) may measure the CPU load of client 210 and may determine that deduplication may be performed on client 210 if client 210 has sufficient CPU capacity available for data deduplication.

In various embodiments, deduplication module 112(*a*) may measure current CPU load, average CPU load and/or any other indicator of client CPU load that may indicate that the CPU load of the client is below the predetermined threshold or that may predict whether there will be sufficient CPU for data deduplication to be performed on the client.

In the case that the CPU load is below the predetermined threshold, the system may deduplicate data on the client (step 630) and may then transfer the non-redundant portion of the data from the client to the server (step 640). For example, if an abundance of CPU is detected on client 210 through a series of measurements of CPU performance, deduplication module 112(*a*) may initiate data deduplication on client 210.

When the CPU loads is above the predetermined threshold the system may first transfer the data from the client to the server (step 650) and may then deduplicate the data on the server (step 660). For example, if measurements of CPU load indicate a lack of CPU while other applications are running for a prolonged period of time then deduplication module 112(a) may shift deduplication to server 230. Steps 630-660 are similar to step 330. Therefore, the discussion of step 330 may also apply to steps 630-660.

Although step 620 describes measuring client CPU load and comparing the CPU load to a predefined threshold to determine whether to perform deduplication on the client, any number of additional or alternative performance metrics of the deduplication system may be measured and compared to predefined thresholds to perform the determination. For example, deduplication module 112(a) may detect a performance degradation in network 240. In this case, deduplication module 112(a) may determine to perform deduplication on client 210 if the available bandwidth of network 240 is below a predetermined threshold. On the other hand, if the available bandwidth of network 240 is above the predetermined threshold, deduplication module 112(a) may determine to perform deduplication on server 230. Deduplication module 112(a) may also implement a variety of other algorithms and/or heuristics to determine where to perform deduplication. Upon the completion of step 640 or step 660 exemplary method 600 of FIG. 6 may terminate.

Figure 7:
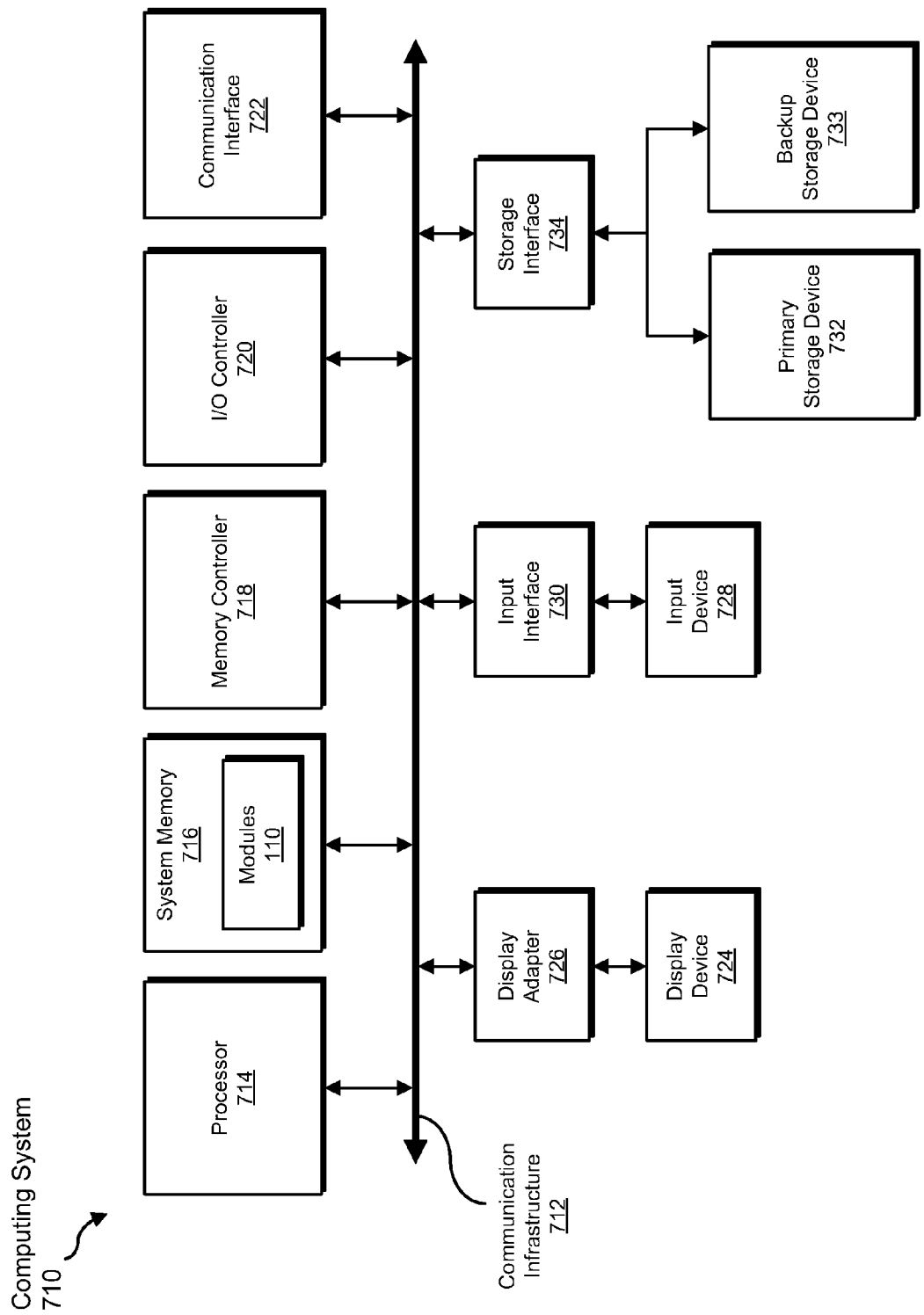
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, determining, performing, deduplicating, transferring, measuring, and setting steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory ("RAM"), read only memory ("ROM"), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 110 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output ("I/O") controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, determining, performing, deduplicating, transferring, measuring, and setting.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, determining, performing, deduplicating, transferring, measuring, and setting steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, determining, performing, deduplicating, transferring, measuring, and setting steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, determining, performing, deduplicating, transferring, measuring, and setting steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, local data 122 and/or SIS data store 132 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, determining, performing, deduplicating, transferring, measuring, and setting steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit ("ASIC") adapted to implement one or more of the exemplary embodiments disclosed herein.

Figure 8:
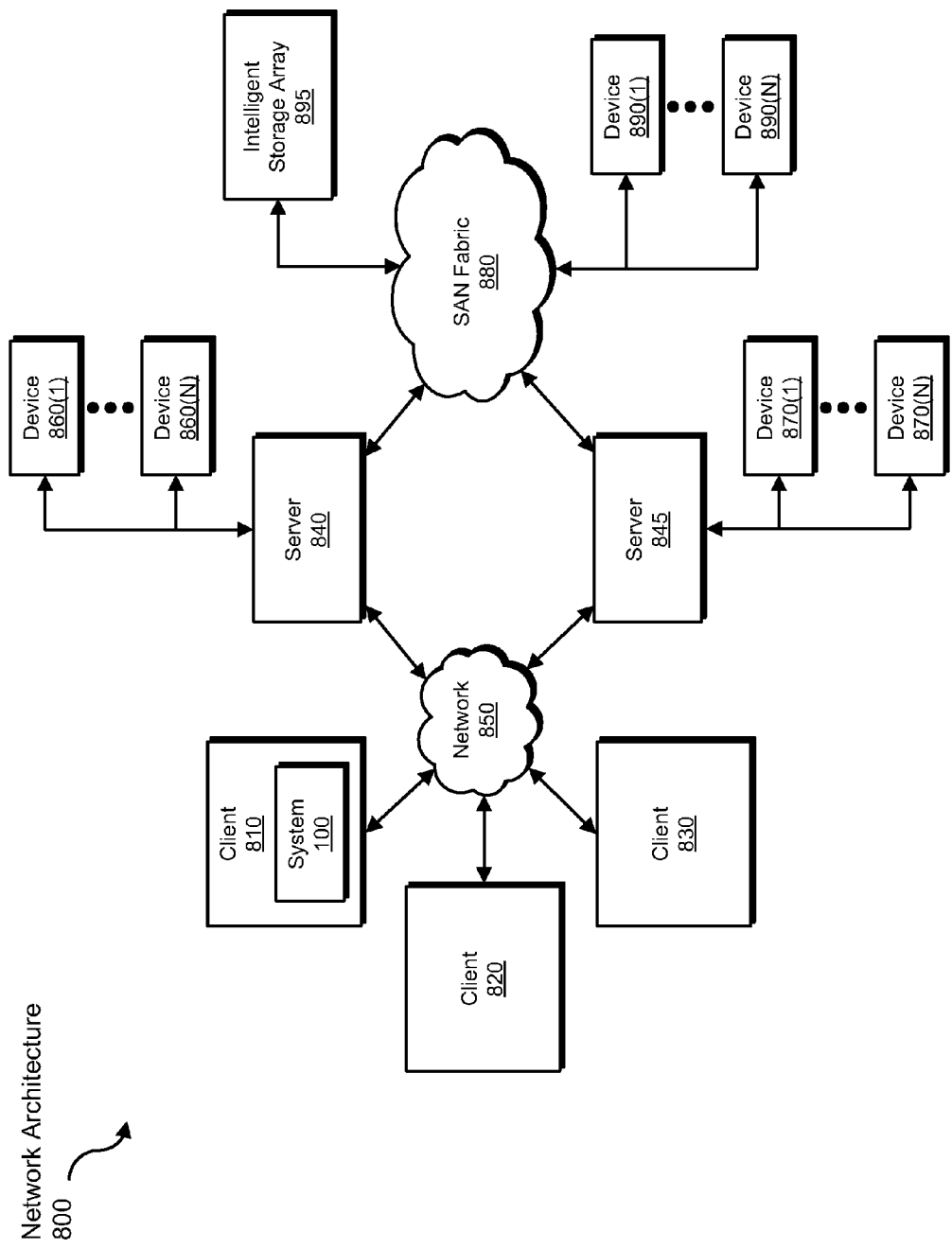
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network ("WAN"), a local area network ("LAN"), a personal area network ("PAN"), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage ("NAS") devices configured to communicate with servers 840 and 845 using various protocols, such as NFS, SMB, or CIFS.

Servers 840 and 845 may also be connected to a storage area network ("SAN") fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, determining, performing, deduplicating, transferring, measuring, and setting steps disclosed herein. Network architecture 800 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules described herein may transform the state of a data storage device by deduplicating data on the data storage device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for deduplicating data, at least a portion of the method being performed by a computing device comprising at least one processor, the method comprising:
   identifying a request to transfer data from a client in a deduplication system to a server in the deduplication system;
   determining whether performing deduplication on the client currently outperforms performing deduplication on the server by:

measuring data throughput while performing deduplication on the client;
measuring data throughput while performing deduplication on the server;
comparing the data throughput while performing deduplication on the client with the data throughput while performing deduplication on the server;
determining, based at least in part on determining whether performing deduplication on the client currently outperforms performing deduplication on the server, whether to perform deduplication of the data on the client before transferring the data from the client to the server or to perform deduplication of the data on the server after transferring the data from the client to the server;
performing the following, the order of which is based on determining whether to perform deduplication of the data on the client before transferring the data from the client to the server or to perform deduplication of the data on the server after transferring the data from the client to the server:
deduplicating the data;
transferring the data from the client to the server.

2. The method of claim 1, wherein:
measuring data throughput while performing deduplication on the client comprises measuring a first span of time that elapses while deduplicating a predetermined amount of data on the client and transferring the predetermined amount of data to the server;
measuring data throughput while performing deduplication on the server comprises measuring a second span of time that elapses while transferring the predetermined amount of data to the server and deduplicating the predetermined amount of data on the server;
determining whether to perform deduplication of the data on the client before transferring the data from the client to the server or to perform deduplication of the data on the server after transferring the data from the client to the server comprises:
determining to deduplicate the data before the data is transferred from the client to the server if the first span is shorter than the second span;
determining to deduplicate the data after the data is transferred from the client to the server if the second span is shorter than the first span.

3. The method of claim 1, wherein:
measuring data throughput while performing deduplication on the client comprises measuring a first amount of data that is deduplicated on the client and transferred to the server during a predetermined interval of time;
measuring data throughput while performing deduplication on the server comprises measuring a second amount of data that is transferred to the server and deduplicated on the server during the predetermined interval of time;
determining whether to perform deduplication of the data on the client before transferring the data from the client to the server or to perform deduplication of the data on the server after transferring the data from the client to the server comprises:
determining to deduplicate the data before the data is transferred from the client to the server if the first amount is greater than the second amount;
determining to deduplicate the data after the data is transferred from the client to the server if the second amount is greater than the first amount.

4. The method of claim 1, wherein determining whether to perform deduplication of the data on the client before transferring the data from the client to the server or to perform deduplication of the data on the server after transferring the data from the client to the server is performed at periodic intervals.

5. The method of claim 4, further comprising:
determining how frequently deduplication switches between the client and the server;
setting a length of at least one of the periodic intervals based on how frequently deduplication switches between the client and the server.

6. The method of claim 1, wherein determining whether performing deduplication on the client currently outperforms performing deduplication on the server is performed at periodic intervals.

7. The method of claim 1, wherein determining whether to perform deduplication of the data on the client before transferring the data from the client to the server or to perform deduplication of the data on the server after transferring the data from the client to the server is based at least in part on a central-processing-unit load on the client.

8. The method of claim 1, wherein determining whether to perform deduplication of the data on the client before transferring the data from the client to the server or to perform deduplication of the data on the server after transferring the data from the client to the server is based at least in part on a central-processing-unit load on the server.

9. The method of claim 1, wherein determining whether to perform deduplication of the data on the client before transferring the data from the client to the server or to perform deduplication of the data on the server after transferring the data from the client to the server is based at least in part on performance of a network that transfers the data from the client to the server.

10. The method of claim 1, wherein determining whether to perform deduplication of the data on the client before transferring the data from the client to the server or to perform deduplication of the data on the server after transferring the data from the client to the server is based at least in part on a comparison of at least two of:
performance of the client;
performance of the server;
performance of a network that transfers the data from the client to the server.

11. The method of claim 1, wherein determining whether to perform deduplication of the data on the client before transferring the data from the client to the server or to perform deduplication of the data on the server after transferring the data from the client to the server is based at least in part on a user preference for preserving a resource of at least one of:
the client;
the server;
a network that transfers the data from the client to the server.

12. A system for deduplicating data, the system comprising:
a data-transfer module programmed to:
identify a request to transfer data from a client in a deduplication system to a server in the deduplication system;
transfer the data from the client to the server;
a deduplication module programmed to:
determine whether performing deduplication on the client currently outperforms performing deduplication on the server by:
measuring data throughput while performing deduplication on the client;
measuring data throughput while performing deduplication on the server;

comparing the data throughput while performing deduplication on the client with the data throughput while performing deduplication on the server;

determine, based at least in part on determining whether performing deduplication on the client currently outperforms performing deduplication on the server, whether to perform deduplication of the data on the client before transferring the data from the client to the server or to perform deduplication of the data on the server after transferring the data from the client to the server;

deduplicate the data;

a storage device configured to store the data;

one or more processors configured to execute the data-transfer module and the deduplication module.

13. The system of claim 12, wherein the deduplication module is programmed to:

measure data throughput while performing deduplication on the client by measuring a first span of time that elapses while deduplicating a predetermined amount of data on the client and transferring the predetermined amount of data to the server;

measure data throughput while performing deduplication on the server by measuring a second span of time that elapses while transferring the predetermined amount of data to the server and deduplicating the predetermined amount of data on the server;

deduplicate the data before the data is transferred from the client to the server if the first span is shorter than the second span;

deduplicate the data after the data is transferred from the client to the server if the second span is shorter than the first span.

14. The system of claim 12, wherein the deduplication module is programmed to determine whether to perform deduplication of the data on the client before transferring the data from the client to the server or to perform deduplication of the data on the server after transferring the data from the client to the server at periodic intervals.

15. The system of claim 14, wherein the deduplication module is programmed to:

determine how frequently deduplication switches between the client and the server;

set a length of at least one of the periodic intervals based on how frequently deduplication switches between the client and the server.

16. The system of claim 12, wherein the deduplication module is programmed to determine whether performing deduplication on the client currently outperforms performing deduplication on the server at periodic intervals.

17. The system of claim 12, wherein the deduplication module is programmed to determine whether to perform deduplication of the data on the client before transferring the data from the client to the server or to perform deduplication of the data on the server after transferring the data from the client to the server based at least in part on a central-processing-unit load on the client.

18. The system of claim 12, wherein the deduplication module is programmed to determine whether to perform deduplication of the data on the client before transferring the data from the client to the server or to perform deduplication of the data on the server after transferring the data from the client to the server based at least in part on a comparison of at least two of:

performance of the client;

performance of the server;

performance of a network that transfers the data from the client to the server.

19. A non-transitory computer-readable-storage medium comprising one or more computer executable instructions that, when executed by at least one processor of a computing device, cause the device to:

identify a request to transfer data from a client in a deduplication system to a server in the deduplication system;

determine whether performing deduplication on the client currently outperforms performing deduplication on the server by:

measuring data throughput while performing deduplication on the client;

measuring data throughput while performing deduplication on the server;

comparing the data throughput while performing deduplication on the client with the data throughput while performing deduplication on the server;

determine, based at least in part on determining whether performing deduplication on the client currently outperforms performing deduplication on the server, whether to perform deduplication of the data on the client before transferring the data from the client to the server or to perform deduplication of the data on the server after transferring the data from the client to the server;

perform the following, the order of which is based on determining whether to perform deduplication of the data on the client before transferring the data from the client to the server or to perform deduplication of the data on the server after transferring the data from the client to the server:

deduplicate the data;

transfer the data from the client to the server.

20. The non-transitory computer-readable-storage medium of claim 19, wherein determining whether to perform deduplication of the data on the client before transferring the data from the client to the server or to perform deduplication of the data on the server after transferring the data from the client to the server is based at least in part on a comparison of at least two of:

performance of the client;

performance of the server;

performance of a network that transfers the data from the client to the server.

* * * * *